(12) United States Patent
Saito (10) Patent No.: US 9,621,809 B2
(45) Date of Patent: Apr. 11, 2017

(54) DISPLAY CONTROL APPARATUS AND METHOD FOR CONTROLLING THE SAME

(71) Applicant: CANON KABUSHIKI KAISHA, Tokyo (JP)

(72) Inventor: Kyota Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 14/231,074

(22) Filed: Mar. 31, 2014

(65) Prior Publication Data

US 2014/0292662 A1    Oct. 2, 2014

(30) Foreign Application Priority Data

Apr. 1, 2013    (JP) ................. 2013-076396

(51) Int. Cl.
*G06F 3/02* (2006.01)
*H04N 5/232* (2006.01)

(52) U.S. Cl.
CPC ............... *H04N 5/23293* (2013.01)

(58) Field of Classification Search
CPC ...... H04N 5/222; H04N 5/225; H04N 5/2258; H04N 5/232; H04N 5/23293; H04N 5/23216; H04N 5/2224; H04N 5/2226; H04N 5/2228; H04N 1/212; H04N 21/4147; H04N 5/23245; G06F 3/0227; G06F 3/04886; G06F 3/04883; G06F 3/0236; G06F 3/1431; G06F 3/041; G06F 3/0412; G06F 3/0416

See application file for complete search history.

(56) References Cited

U.S. PATENT DOCUMENTS

| | | | | |
|---|---|---|---|---|
| 6,167,469 A * | 12/2000 | Safai et al. | ...................... | 710/62 |
| 6,778,217 B1 * | 8/2004 | Nishimura | ............... | 348/333.12 |
| 7,233,356 B2 * | 6/2007 | Nagao | ...................... | 348/333.02 |
| 7,358,991 B2 * | 4/2008 | Kokubun | ................... | 348/231.2 |
| 7,551,220 B2 * | 6/2009 | Morikawa | ............ | H04N 5/2251 |
| | | | | 348/14.07 |
| 8,344,870 B2 * | 1/2013 | Evans | ................. | G06F 3/04817 |
| | | | | 340/461 |
| 8,803,817 B1 * | 8/2014 | Froment | ............... | G06F 3/0488 |
| | | | | 345/1.1 |
| 2009/0115880 A1 * | 5/2009 | Wada et al. | .............. | 348/333.01 |
| 2011/0210922 A1 * | 9/2011 | Griffin | .................. | G06F 1/1624 |
| | | | | 345/173 |
| 2012/0262592 A1 * | 10/2012 | Rabii | ....................... | 348/208.16 |
| 2013/0016040 A1 * | 1/2013 | Ahn | ...................... | G06F 1/1654 |
| | | | | 345/163 |

FOREIGN PATENT DOCUMENTS

| | | |
|---|---|---|
| JP | 5-41822 A | 2/1993 |
| JP | 2002209125 A | 7/2002 |
| JP | 2009200857 A | 9/2009 |

* cited by examiner

*Primary Examiner* — Jennifer Mehmood
*Assistant Examiner* — Sardis F Azongha
(74) *Attorney, Agent, or Firm* — Canon U.S.A., Inc. IP Divison

(57) ABSTRACT

A display control apparatus includes a first display unit in an eyepiece viewfinder, a second display unit configured to be visible without the user's eye being in contact therewith, and a display control unit configured to perform control to display a soft keyboard on the second display unit without displaying the soft keyboard on the first display unit in response to an operation for displaying the soft keyboard during display on the first display unit.

13 Claims, 4 Drawing Sheets

DISPLAY CONTROL APPARATUS AND METHOD FOR CONTROLLING THE SAME

BACKGROUND OF THE INVENTION

Field of the Invention

The present invention relates to a display control apparatus capable of inputting characters by operating a soft keyboard displayed on a display and a method for controlling the display control apparatus.

Description of the Related Art

Inputting characters using a software keyboard (hereinafter referred to as soft keyboard) has been widely performed as one of methods for inputting characters into an electronic apparatus which is not equipped with a keyboard as hardware. The method is the one that a soft keyboard is displayed on a display and a user selects and determines or touches a desired character key by a cursor to input a desired character.

Japanese Patent Application Laid-Open No. 05-41822 discusses a method for inputting characters at the time of inputting a character title which is to be recorded on a moving image in a superimposition manner, in a video camera equipped with an eyepiece viewfinder (i.e., a look-into type finder). In Japanese Patent Application Laid-Open No. 05-41822, a photographer inputs a character string by selecting/determining, from among a plurality of character keys displayed on a display in the viewfinder, a desired character key using an operation switch.

In the method discussed in Japanese Patent Application Laid-Open No. 05-41822, however, the photographer needs to select a desired character key using a cursor while looking into the viewfinder in a cramped posture.

SUMMARY OF THE INVENTION

The present invention is directed to a display control apparatus capable of inputting characters in a user-friendly manner by avoiding drawbacks in operating a soft keyboard while looking into an eyepiece viewfinder and a method for controlling the display control apparatus.

According to an aspect of the present invention, a display control apparatus includes a first display unit in an eyepiece viewfinder, a second display unit configured to be visible without a user's eye being in contact therewith, and a display control unit configured to perform control to display a soft keyboard on the second display unit without displaying the soft keyboard on the first display unit in response to an operation for displaying the soft keyboard during display on the first display unit.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

An exemplary embodiment of the present invention will be described below with reference to the accompanying drawings.

<Hardware>

Figure 1A:
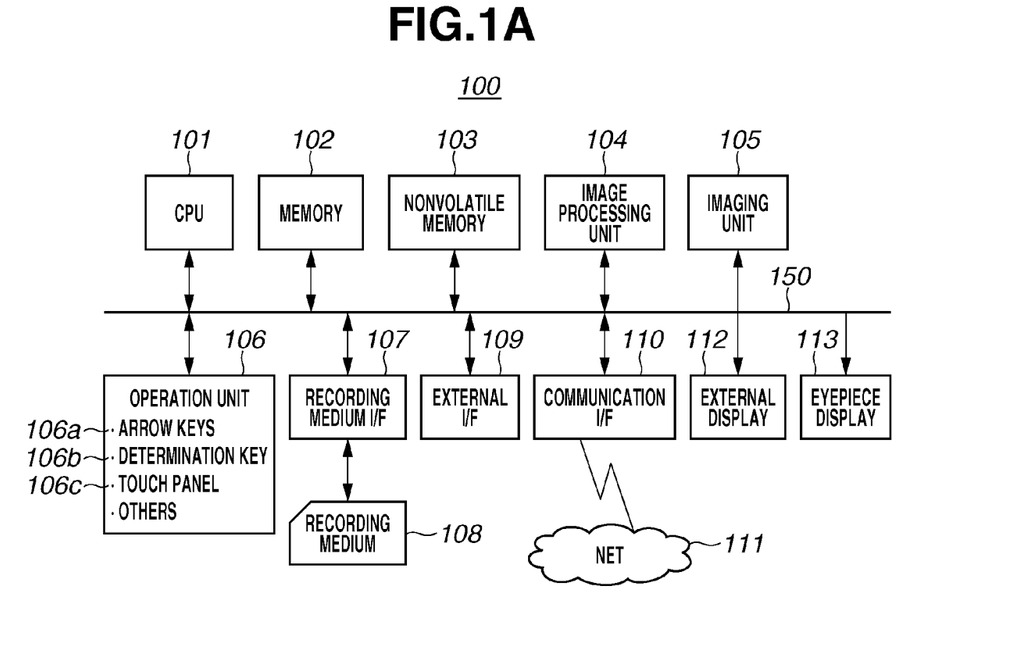
FIGS. 1A and 1B respectively illustrate a schematic block diagram and an external view of a digital video camera.
Figure 1B:
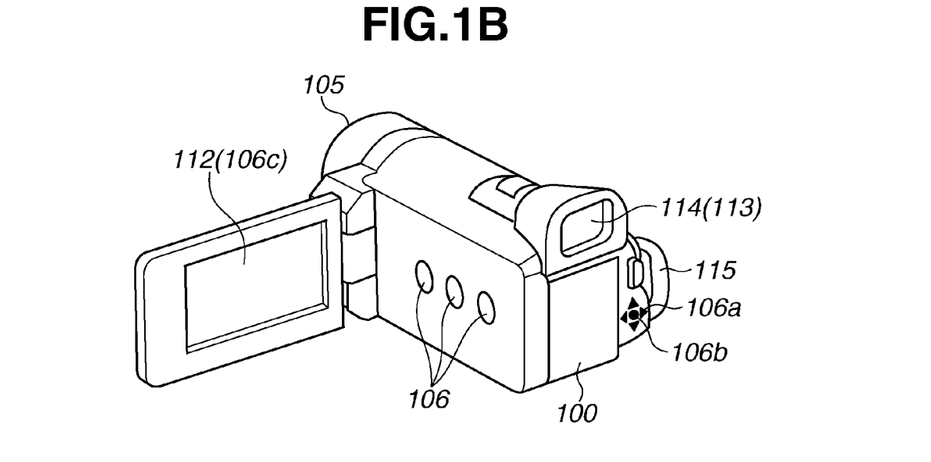

FIG. 1A illustrates an example of a configuration of a digital video camera 100 as an example of a display control apparatus to which the present invention can be applied. FIG. 1B illustrates an external view of the digital video camera 100.

In FIG. 1A, a central processing unit (CPU) 101, a memory 102, a nonvolatile memory 103, an image processing unit 104, an imaging unit 105, an operation unit 106, a recording medium interface (I/F) 107, an external I/F 109, and a communication I/F 110 are connected to an internal bus 150. An external display 112 (a second display unit) and an eyepiece display 113 (a first display unit) visible in a look-into type finder (an eyepiece finder) are also connected to the internal bus 150. The units connected to the internal bus 150 can exchange data with each other via the internal bus 150.

The memory 102 includes a random access memory (RAM) (a volatile memory using a semiconductor device), for example. The CPU 101 controls the units of the digital video camera 100 according to a program stored in the nonvolatile memory 103, using the memory 102 as a work memory. The nonvolatile memory 103 stores image data, audio data, other data, and various programs for operating the CPU 101. The nonvolatile memory 103 includes a hard disk (HD) and a read-only memory (ROM), for example.

The image processing unit 104 performs various image processing on image data stored in the nonvolatile memory 103 and a recording medium 108, a video signal acquired via the external I/F 109, and image data acquired via the communication I/F 110 based on the control of the CPU 101. The image processing unit 104 further performs various image processing on video data captured by the imaging unit 105. The image processing performed by the image processing unit 104 include analog-to-digital (A/D) conversion processing, digital-to-analog (D/A) conversion processing, image data encoding processing, compression processing, decoding processing, expansion/reduction processing (resizing), noise reduction processing, and color conversion processing. The image processing unit 104 can be made of a dedicated circuit block for performing specific image processing. The CPU 101 instead of the image processing unit 104 may perform image processing depending on the type of image processing. The image processing unit 104 processes the video data captured by the imaging unit 105 substantially in real time, and sequentially transmits the processed video data to the external display 112 and the eyepiece display 113 to display the data on the displays 112 and 113, thereby causing the displays 112 and 113 to function as an electronic viewfinder to allow through-image display (live view display).

The imaging unit 105 is a camera unit including a lens group such as a focus lens and a zoom lens, a shutter, a diaphragm, an image sensor such as a charge-coupled device (CCD) sensor and a complementary metal-oxide semiconductor (CMOS) sensor, and an AD converter for converting data photoelectrically converted by the image sensor into a digital signal. The imaging unit 105 captures a moving image or a still image according to an imaging instruction input by operating the operation unit 106. The image data captured and generated by the imaging unit 105 is transmitted to the image processing unit 104 via the internal bus 150, and the image processing unit 104 performs various image processing and compressing encoding processing on the image data to generate an image file. The generated image file is transmitted to the recording medium I/F 107 and stored in the recording medium 108.

The operation unit 106 is an input device for receiving a user's operation, including a button, a dial, a joy stick, a touch sensor, and a touch pad. The operation unit 106 includes arrow keys 106a, a determination key 106b, and a touch panel 106c. The arrow keys 106a (direction key) are direction operation members made of four operation members of upper, lower, left, and right buttons. The arrow keys 106a may be configured by a single operation member in which upper, lower, left, and right portions can be individually pressed. The determination key 106b is a press button mainly used for determining selection items. For example, the user operates the arrow keys 106a to move a cursor displayed on any of a plurality of the selection items displayed on the external display 112 and/or the eyepiece display 113 onto a desired selection item. In this state, the user presses the determination key 106b to determine the selection and to execute the function of the selection item onto which the cursor is moved. The touch panel 106c is an input device which is flatly configured in a superposition manner on the external display 112 and configured to output coordinate information according to the position touched.

The recording medium I/F 107, to which the recording medium 108 such as a memory card, a compact disk (CD), and a digital versatile disc (DVD) can be attached, reads data from and writes data in the attached recording medium 108. The external I/F 109 is an interface which connects the camera with an external apparatus via a cable or wireless communication to input or output video and audio signals. The communication I/F 110 is an interface which communicates with an external apparatus or an internet 111 to transmit and receive various data such as a file and a command.

The external display 112 is made of a liquid crystal panel. The external display 112 is provided on a variable angle display portion of the digital video camera 100 to allow the user of the digital video camera 100 to view an image without using an eyepiece. The digital video camera 100 is equipped with an open and close detection switch (not illustrated) for detecting where the variable angle display portion is positioned with respect to the main body of the digital video camera 100. The external display 112 is turned on or off according to the position of the variable angle display portion (the output from the open and close detection switch). When the variable angle display portion is in a position where it is closed to the main body such that the display surface of the external display 112 faces the main body of the digital video camera 100, the external display 112 is turned off. When the variable angle display portion is in a position where it is opened to the main body, and when the display surface of the external display 112 can be viewed from the user with the variable angle display portion in a position where it is closed to the main body, the external display 112 is turned on. The external display 112 may be configured to be turned on or off irrespective of the position of the variable angle display portion.

The eyepiece display 113 is provided in the viewfinder of the digital video camera 100. The user can view the image displayed on the eyepiece display 113 via an eyepiece portion 114. The viewfinder provided in the digital video camera 100 can be mechanically moved to a pulled-out position and a stored position. The eyepiece display 113 includes a detection switch (not illustrated) capable of detecting whether the viewfinder lies in the pulled-out position or the stored position. Based on output from the detection switch, the eyepiece display 113 is turned on when the finder lies in the pulled-out position and turned off when the finder lies in the stored position. The eyepiece display 113 can be turned on or off irrespective of the position of the viewfinder.

The visibility of the eyepiece display 113 is insusceptible to the strength of external light since the user views an image with its eye in contact with the eyepiece display 113. For example, under bright weather with the strong sun shining, it is sometimes difficult to view the image displayed on the external display 112 while the image displayed on the eyepiece display 113 can be viewed with high visibility by looking into the viewfinder. Displaying an image on the external display 112 in a dark place such as a concert hall makes back light conspicuous while displaying an image on the eyepiece display 113 is not conspicuous. The user can selectively view an image displayed on the external display 112 or on the eyepiece display 113.

The external display 112 or the eyepiece display 113 displays a graphical user interface (GUI) screen including an image or a GUI based on the control of the CPU 101. The CPU 101 controls the units of the digital video camera 100 so that a display control signal is generated according to the program and a video signal to be displayed on the external display 112 and/or the eyepiece display 113 is generated. The CPU 101 also controls the units of the digital video camera 100 so that the generated video signal is output to the external display 112 and/or the eyepiece display 113. The external display 112 and/or the eyepiece display 113 displays an image based on the output video signal.

The digital video camera 100 is a portable device which can be held with a single hand by holding a grip portion 115.

The CPU 101 can detect the following operations performed on the touch panel 106c or states therein:

touching the touch panel 106c with a finger or a stylus (hereinafter referred to as "touch-down");

a state in which the touch panel 106c is being touched with a finger or a stylus (hereinafter referred to as "touch-on");

moving with the touch panel 106c being touched with a finger or a stylus (hereinafter referred to as "touch-move");

a state in which a finger or a stylus with which the touch panel 106c is touched is released (hereinafter referred to as "touch-up"); and a state in which nothing touches the touch panel 106c (hereinafter referred to as "touch-off").

The CPU 101 is notified of the above operations or states and a coordinate of a position at which a finger or a stylus touches the touch panel 106c, via the internal bus 150, and determines, based on the information of which the CPU 101 is notified, which operations are performed on the touch panel 106c (touch detection). As for the touch-move, the CPU 101 can determine the movement direction in which a finger or a stylus moves on the touch panel 106c for each of the vertical and the horizontal components of the touch panel 106c, based on a change in the position coordinate. Sequentially performing the touch-down, the touch-move, and the touch-up on the touch panel 106c is referred to as a stroke. A quick stroke operation is referred to as a flick. The flick is such an operation that the finger touching the touch panel 106c is quickly moved to a certain degree of a distance and quickly released. In other words, the flick is an operation that the finger quickly moves along the touch panel 106c as if the finger flips the touch panel 106c. When the touch-move over a predetermined distance and at a predetermined speed or higher is detected and the touch-up is detected as it is, it is determined that the flick is performed. When the touch-move over the predetermined distance and at a speed not higher than the predetermined speed is detected, it is determined that the drag is performed. The touch panel 106c may use any of the methods among various types of touch panels such as a resistive film method, an electrostatic capacity method, a surface acoustic wave method, an infrared method, an electromagnetic induction method, an image recognition method, and an optical sensor method.

Display Examples

Figure 2:
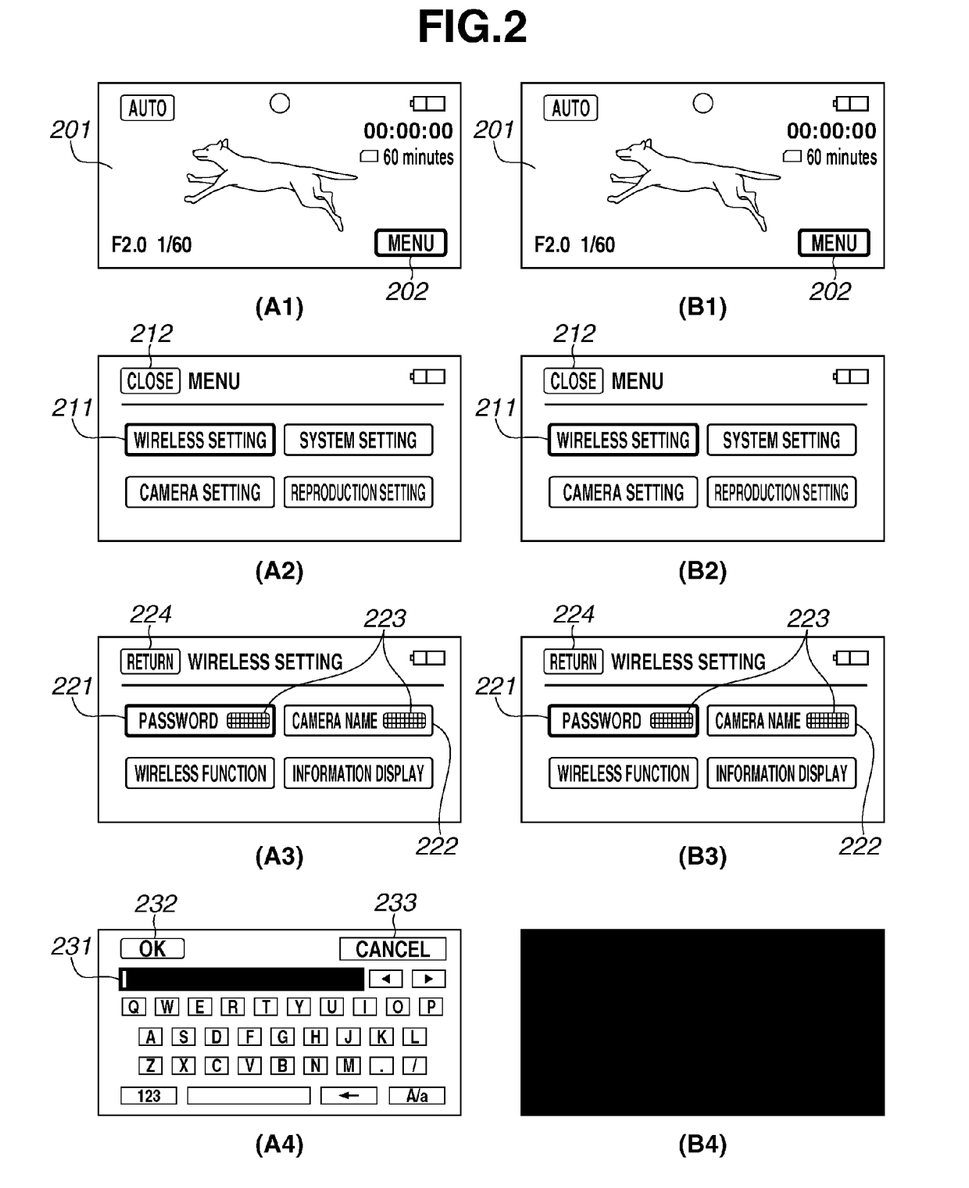
FIG. 2 illustrates various display examples of an external display and an eyepiece display.

Screens A1 to A4 in FIG. 2 illustrate display examples of the external display 112 when it is turned on. Screens B1 to B4 in FIG. 2 illustrate display examples of the eyepiece display 113 when the viewfinder lies in the pulled-out position.

The screen A1 in FIG. 2 is a display example of the external display 112 in an imaging standby state or a moving-image capturing state. The screen B1 in FIG. 2 is a display example of the eyepiece display 113 in an imaging standby state or a moving-image capturing state. As illustrated in the figures, similar screens are displayed on the external display 112 and the eyepiece display 113 in the imaging standby state or the moving-image capturing state. The display includes a live view image 201 being captured by the imaging unit 105, various pieces of information, and an icon (an option item). The arrow keys 106a are operated to move a cursor (a thick frame in the figure) onto any of the displayed icons (option items) and the determination key 106b is pressed to select and determine the option item. Directly touching the icon (the option item) displayed on the external display 112 also selects and determines the option item. The selection and determination based on the operations of the arrow keys 106a and the determination key 106b and those based on the touch operation detected on the touch panel 106c are collectively and simply referred to as selection determination. In the screens A1 and B1 of FIG. 2, a menu icon 202 is selected and determined to display a menu screen.

A screen A2 in FIG. 2 is a display example of the menu screen on the external display 112. A screen B2 in FIG. 2 is a display example of the menu screen on the eyepiece display 113. As illustrated in the figures, similar screens are displayed even in the menu screen of the external display 112 and the eyepiece display 113. The menu screen displays a plurality of option items including a wireless setting icon 211 and a close icon 212. The wireless setting icon 211 is selected and determined on the screen to display a wireless setting menu.

A screen A3 in FIG. 2 is a display example of the wireless setting menu on the external display 112. A screen B3 in FIG. 2 is a display example of the wireless setting menu on the eyepiece display 113. As illustrated in the figures, similar screens are displayed even in the wireless setting menu of the external display 112 and the eyepiece display 113. The wireless setting menu screen displays a plurality of option items including a password setting icon 221, a camera name setting icon 222, and a return icon 224. The password setting icon 221 or the camera name setting icon 222 is selected and determined to display a soft keyboard screen. For the sake of easy understanding, an icon 223 representing a soft keyboard is displayed on each of the password setting icon 221 and the camera name setting icon 222.

A screen A4 in FIG. 2 is a display example of the soft keyboard screen on the external display 112. A screen B4 in FIG. 2 is a display example of the eyepiece display 113 when the soft keyboard screen is displayed on the external display 112. As illustrated in the figure, display is different between the external display 112 and the eyepiece display 113 at the time of displaying the soft keyboard screen. The soft keyboard screen is displayed on the external display 112 while nothing is displayed on the eyepiece display 113. The soft keyboard screen displayed on the external display 112 displays various character keys, a character input field 231, an OK button 232 being a soft key, and a cancel button 233 being a soft key. Control for the above screen transition is described below with reference to a flow chart.

<Flow Chart>

Figure 3:
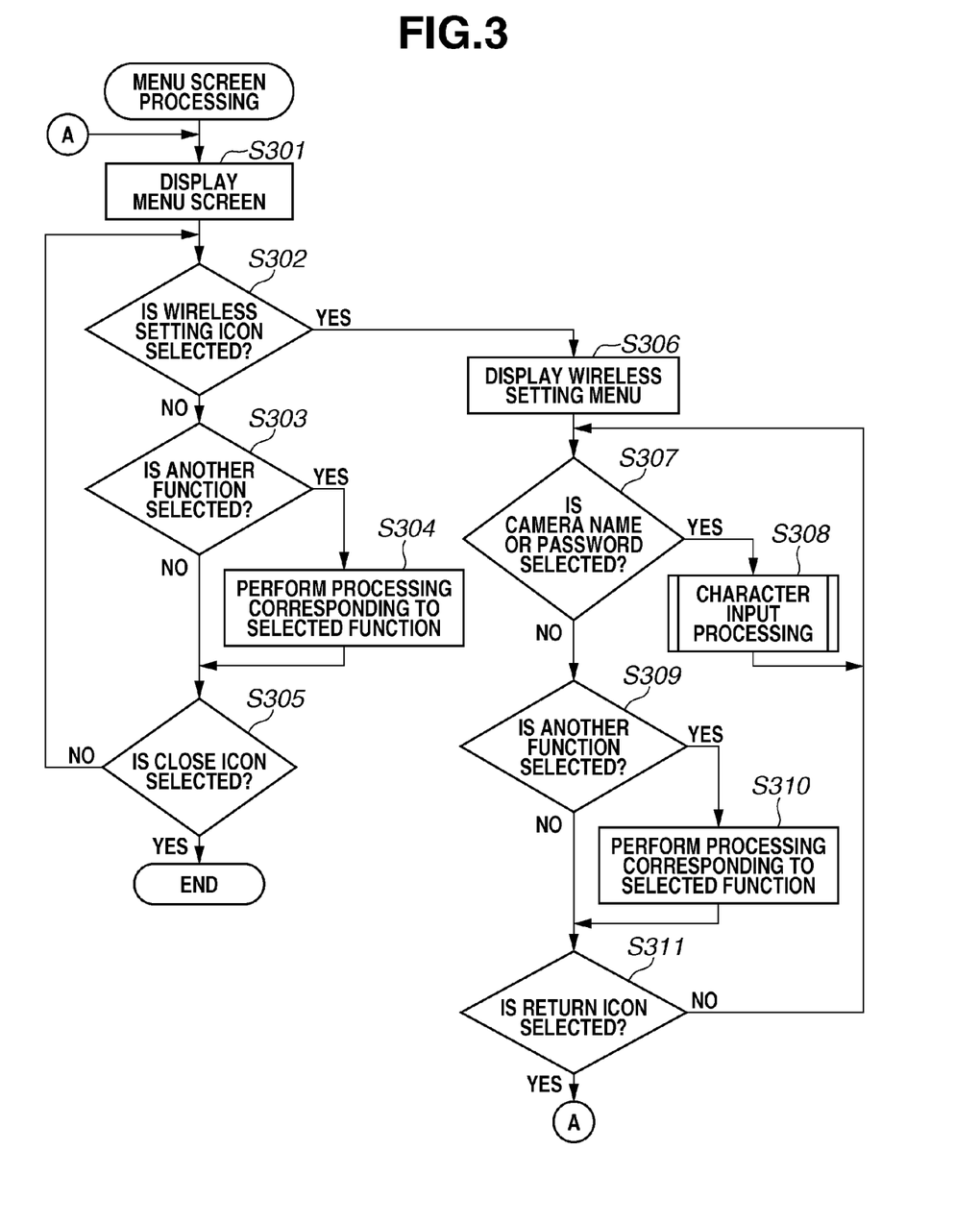
FIG. 3 illustrates a flow chart for a menu screen processing.

FIG. 3 illustrates a flow chart for a menu screen processing. The processing is realized by the CPU 101 loading the program recorded in the nonvolatile memory 103 into the memory 102 and executing the program. When the menu icon 202 is selected and determined on the screens A1 or B1 in the imaging standby state as illustrated in FIG. 2, the processing in FIG. 3 is started.

In step S301, the CPU 101 displays the menu screen both on the external display 112 and on the eyepiece display 113. The display examples of the menu screen are illustrated on the screens A2 and B2 in FIG. 2.

In step S302, the CPU 101 determines whether the wireless setting icon 211 is selected and determined from among the option items displayed on the menu screen. More specifically, the CPU 101 determines whether the determination key 106b is pressed with the cursor moved onto the wireless setting icon 211 or the wireless setting icon 211 displayed on the external display 112 is touched. In the following description, we assume that a determination as to whether the wireless setting icon 211 is selected and determined is made based on whether the determination key 106b is pressed with the cursor moved thereonto or the icon displayed on the external display 112 is touched. If the CPU 101 determines that the wireless setting icon 211 is selected and determined (YES in step S302), the processing proceeds to step S306. If the CPU 101 determines that the wireless setting icon 211 is neither selected nor determined (NO in step S302), the processing proceeds to step S303.

In step S303, the CPU 101 determines whether another option item except the wireless setting icon 211 and the close icon 212 is selected and determined from among the displayed option items. If the CPU 101 determines that another option item is selected and determined (YES in step S303), the processing proceeds to step S304 to perform processing corresponding to the selected and determined item. If the CPU 101 determines that other option items are neither selected nor determined (NO in step S303), the processing proceeds to step S305.

In step S305, the CPU 101 determines whether the close icon 212 is selected and determined. If the CPU 101 determines that the close icon 212 is selected and determined (YES in step S305), the menu screen processing is ended and the screen shifts back to the imaging standby screen. If the CPU 101 determines that the close icon 212 is neither selected nor determined (NO in step S305), the processing returns to step S302 to repeat the processing.

In step S306, the CPU 101 displays the wireless setting menu both on the external display 112 and on the eyepiece display 113. The display examples of the wireless setting menu are illustrated on the screens A3 and B3 in FIG. 2.

In step S307, the CPU 101 determines whether the password setting icon 221 or the camera name setting icon 222 is selected and determined from among the option items displayed on the wireless setting menu. In other words, the CPU 101 determines whether an operation for displaying the soft keyboard is performed. If the CPU 101 determines that the password setting icon 221 or the camera name setting icon 222 is selected and determined (YES in step S307), the processing proceeds to step S308. If the CPU 101 determines that the password setting icon 221 or the camera name setting icon 222 is neither selected nor determined (NO in step S307), the processing proceeds to step S309.

In step S308, the CPU 101 performs character input processing. The character input processing is described below with reference to FIG. 4.

In step S309, the CPU 101 determines whether another option item except the password setting icon 221, the camera name setting icon 222, and the return icon 224 is selected and determined from among the option items displayed on the wireless setting menu. If the CPU 101 determines that another option item is selected and determined (YES in step S309), the processing proceeds to step S310 to perform processing corresponding to the selected and determined item. If the CPU 101 determines that other option items are neither selected nor determined (NO in step S309), the processing proceeds to step S311.

In step S311, the CPU 101 determines whether the return icon 224 is selected and determined. If the CPU 101 determines that the return icon 224 is selected and determined (YES in step S311), the processing returns to step S301 to repeat the processing. If the CPU 101 determines that the return icon 224 is neither selected nor determined (NO in step S311), the processing returns to step S307.

Figure 4:
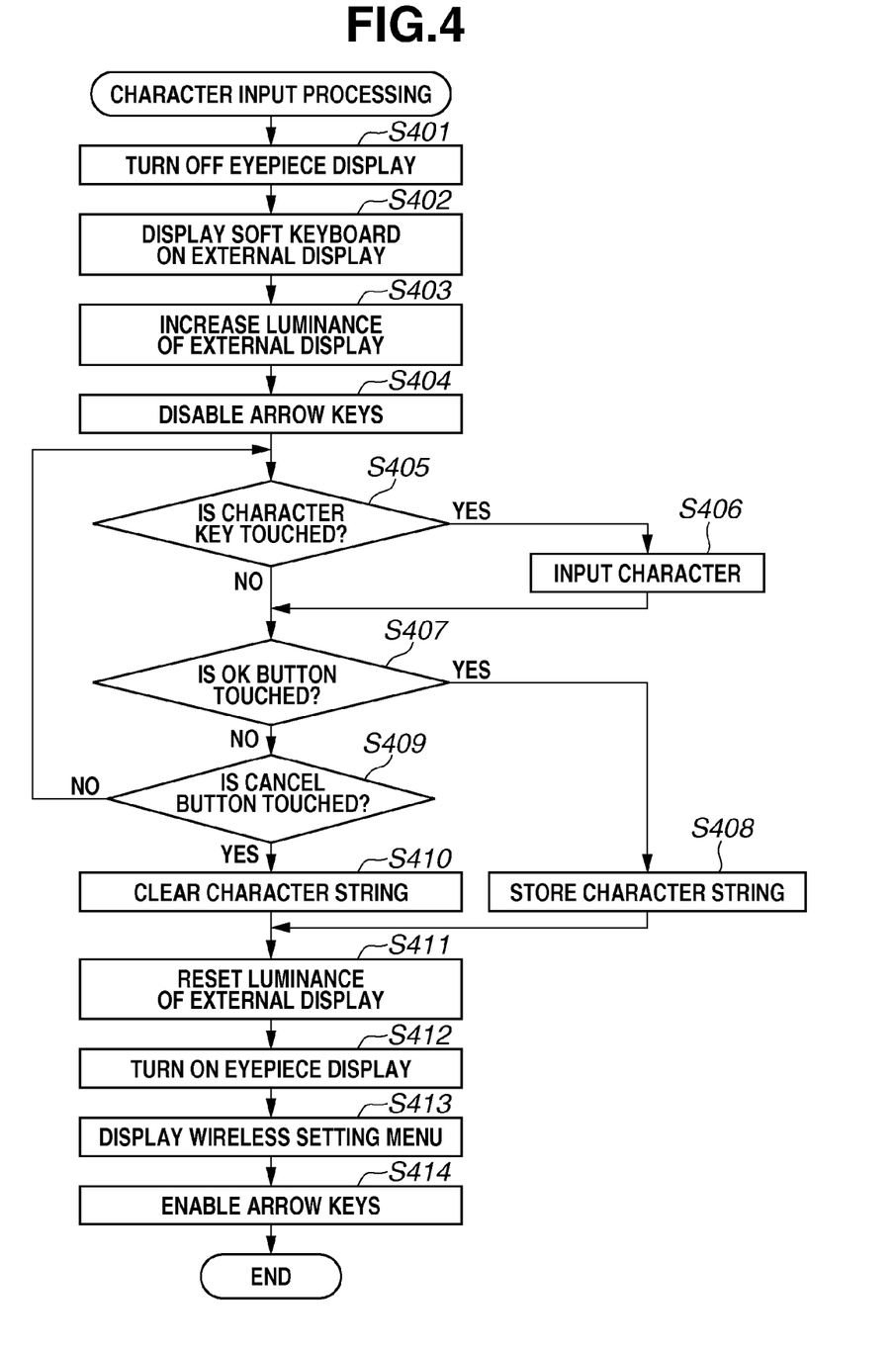
FIG. 4 is a flow chart for a character input processing.

FIG. 4 is a flow chart for character input processing illustrating step S308 of FIG. 3 in detail. The processing is realized by the CPU 101 loading the program recorded in the nonvolatile memory 103 into the memory 102 and executing the program.

In step S401, the CPU 101 turns off the eyepiece display 113. In other words, the display of the eyepiece display 113 is turned off and the back light thereof is turned off. If the eyepiece display 113 is a self-luminous display such as an organic electro-luminescence (EL) display, not the back light but the eyepiece display 113 itself is turned off. That is, nothing is displayed on the eyepiece display 113 as illustrated on the screen B4 in FIG. 2. For this reason, it is meaningless for the user looking into the viewfinder to look thereinto, and the user stops looking thereinto and inputs characters while watching the soft keyboard screen displayed on the external display 112. Thus, the eyepiece display 113 is turned off to urge the user to release its eye from the viewfinder and to input characters, which prevents the user from inputting characters while looking into the viewfinder in a cramped posture. With this configuration, the user can quickly input characters in a comfortable posture. Before the eyepiece display 113 is turned off, such a guidance that "operate the keyboard on the liquid crystal screen" or "the keyboard is displayed on the liquid crystal screen" may be displayed on the eyepiece display 113 for several seconds. In the above guidance example displayed for the user, the external display 112 is referred to as a "liquid crystal screen." However, the name is not limited to this. Any name can be used as long as the user can understand that the name refers to the external display 112. Displaying a guidance on the eyepiece display 113 can urge the user to input characters while viewing the external display 112.

In step S402, the CPU 101 displays the soft keyboard screen illustrated on the screen the screen A4 in FIG. 2. At this point, if the arrow keys 106a are disabled in step S404 described below, the cursor is not displayed.

In step S403, the CPU 101 increases the luminance of the external display 112. In other words, the CPU 101 increases the amount of back light of the external display 112. If the external display 112 is a self-luminous display such as an organic EL, the luminance of the display device itself is increased. This is because the camera may be used in a bright outdoor environment since the eyepiece display 113 had been turned on. That is, the luminance of the external display 112 is increased to increase visibility. For example, the luminance may be increased (set) to the maximum. If the external display 112 is equipped with an external light sensor, the luminance of the external display 112 may be increased according to ambient brightness detected by the external light sensor, that is, the luminance may be increased only if brightness exceeding a predetermined brightness is detected. In a dark place where the ambient brightness detected by the external light sensor is lower than a specified brightness, the luminance of the external display 112 may be decreased to make the external display 112 inconspicuous. Alternatively, at this point, if the external display 112 is turned off, the camera is presumed to be in a dark place, and the external display 112 may be turned on at lower luminance (at the minimum luminance, for example) to make the external display 112 inconspicuous. If the external display 112 is turned on from being off, a guidance for urging the user to perform operation while viewing the external display 112 is displayed on the eyepiece display 113. In S403, the luminance control processing may be omitted not to change the luminance of the external display 112.

In step S404, the CPU 101 disables the arrow keys 106a. Thus, even if the user presses the arrow key 106a, control is not performed in response to the pressing. Disabling the arrow keys 106a can urge the user to use the touch panel 106c. Limiting input to input using the touch panel 106c eliminates a cursor movement operation, and enables the user to input characters by an operation for directly pressing desired character keys. In other words, the user can quickly input characters without trouble. The processing in step S404 may be omitted to keep the arrow keys 106a enabled.

In step S405, the CPU 101 determines whether any character key on the soft keyboard screen displayed on the external display 112 is touched. If the CPU 101 determines that a character key is touched (YES in step S405), the processing proceeds to step S406. If the CPU 101 determines that no character key is touched (NO in step S405), the processing proceeds to step S407. If the processing in step S404 is omitted, whichever character key is selected and determined, the processing proceeds to step S406.

In step S406, the CPU 101 inputs characters corresponding to the touched character key. The input characters are stored in the memory 102 and displayed on the character input field 231. When characters are successively input, the subsequent characters are displayed side by side on the space of the character input field 231.

In step S407, the CPU 101 determines whether the OK button 232 displayed on the external display 112 is touched. Touching the OK button 232 corresponds to an instruction for hiding the soft keyboard. If the CPU 101 determines that the OK button is touched (YES in step S407), the processing proceeds to step S408. If the CPU 101 determines that the OK button is not touched (NO in step S407), the processing proceeds to step S409. If the processing in step S404 is omitted, even if the OK button 232 is selected and determined, the processing proceeds to step S408.

In step S408, the CPU 101 determines the input characters (the character string stored in the memory 102 and displayed on the character input field 231), sets the characters as a password or a camera name, and records (stores) the characters in the nonvolatile memory 103.

In step S409, the CPU 101 determines whether the cancel button 233 displayed on the external display 112 is touched. Touching the cancel button 233 corresponds to an instruction for hiding the soft keyboard. If the CPU 101 determines that the cancel button 233 is touched (YES in step S409), the processing proceeds to step S410. If the CPU 101 determines that the cancel button 233 is not touched (NO in step S409), the processing returns to step S405 to repeat the processing. If the processing in step S404 is omitted, even if the cancel button 233 is selected and determined, the processing proceeds to step S410.

In step S410, the characters input by the CPU 101 (the character string stored in the memory 102 and displayed on the character input field 231) are cleared.

In step S411, the CPU 101 resets the luminance of the external display 112 increased in step S403 to an original luminance which is not yet increased in step S403.

In step S412, the CPU 101 turns on the eyepiece display 113 which has been turned off in step S401.

In step S413, the CPU 101 displays the wireless setting menu both on the external display 112 and on the eyepiece display 113. The display examples of the wireless setting menu are illustrated on the screen the screens A3 and B3 in FIG. 2.

In step S414, the CPU 101 enables the arrow keys 106a which has been disabled in step S404. The processing in step 414 is completed to end the character input processing. The processing returns to step S307 in FIG. 3.

The above example describes that characters are input on the soft keyboard screen displayed under the hierarchy of the wireless setting menu. However, the present invention is not limited to the example. Even in other operational states, the processing similar to that in FIG. 4 is performed in response to an operation for displaying the soft keyboard screen being performed. More specifically, the soft keyboard screen is displayed only on the external display 112 even if display is performed both on the external display 112 and on the eyepiece display 113 until immediately before the soft keyboard screen is displayed.

The selection and determination operations of the password setting icon 221 and the camera name setting icon 222 are cited as examples of an operation for displaying the soft keyboard. The present invention is not limited to the above examples. In the screen on which a field for displaying various character strings such as a password or a camera name is displayed, selecting and determining any field for displaying character strings also correspond to the operation for displaying the soft keyboard. For example, we presume that the soft keyboard is not displayed and a screen displaying both of a password character-string display field and a camera-name character-string display field is displayed. In the password character-string display, a password is displayed by asterisks (*) while in the a camera-name character-string display field, a camera name is displayed by a character string. On this screen, if the password character-string display field or the camera-name character-string display field is touched to be selected and determined, the processing in FIG. 4 may be performed to input characters into the selected and determined character-string display field. In this case, if the OK button 232 is touched to store the character string in steps S407 and S408 of FIG. 4, the stored character string is displayed on both of the eyepiece display 113 and the external display 112, in the character-string display field of the screen which is displayed after the processing in FIG. 4. A password is displayed by asterisks and only the number of characters is reflected.

The above example describes that the eyepiece display 113 is turned off in step S401. However, such a guidance that "operate the keyboard on the liquid crystal screen" may be continuously displayed without the eyepiece display 113 being turned off. Also in this case, the soft keyboard screen is not displayed on the eyepiece display 113. Displaying such a guidance on the eyepiece display 113 without turning off the eyepiece display 113 can urge the user to input characters while viewing the external display 112. Alternatively, instead of displaying the soft keyboard screen without turning off the eyepiece display 113, displaying the character string input on the soft keyboard screen displayed on the external display 112 enables confirming input characters even on the eyepiece display 113.

In step S401 described above, if the external display 112 is turned off, a screen for selecting whether to turn on the external display 112 before turning off the eyepiece display 113 may be displayed on the eyepiece display 113. If the user performs operation for selecting turning on the external display 112, the external display 112 is turned on to display the soft keyboard screen. In this case, the eyepiece display 113 displays a guidance for urging the user to input characters while viewing the external display 112, without being turned off nor displaying the soft keyboard screen. On the other hand, if the user performs operation for selecting not turning on the external display 112, the external display 112 is not turned on. In this case, the soft keyboard screen may be displayed to make the user input characters using the arrow keys 106a and the determination key 106b while looking into the viewfinder in a cramped posture. Alternatively, such a guidance that characters cannot be input may be displayed on the eyepiece display 113, and then the screen may shift back to the previous screen (the wireless setting menu in the example of FIG. 4). This can prevent the external display 112 from unintentionally being turned on in a case where the external display 112 is turned off to make the camera inconspicuous in a dark environment.

As described above, according to the present exemplary embodiment, the user can avoid drawbacks in operating the soft keyboard while looking into the viewfinder and can input characters in a user-friendly manner while viewing the external display 112. Turning off the eyepiece display 113 at the time of inputting characters can save power. Therefore, the present exemplary embodiment is effective for the user who habitually performs operations with its eye released from the viewfinder when inputting characters.

A single hardware component may control the CPU 101 or a plurality of hardware components may share the processing to control the entire apparatus.

The present invention is described above in detail based on the exemplary embodiment. The present invention is not limited to a specific exemplary embodiment, but includes various exemplary embodiments without departing from the spirit of the present invention. It should be construed that the above exemplary embodiment is merely an exemplary embodiment of the present invention and each exemplary embodiment can appropriately be combined with each other.

The above exemplary embodiment describes a case, as an example, where the present invention is applied to a digital video camera. However, an exemplary embodiment of the present invention is not limited to this example. The present invention is applicable to any display control apparatus for controlling a display system including both a display which can be viewed with a user's eye being in contact with a viewfinder and a display which can be viewed without the user's eye being in contact with a viewfinder. That is, the present invention is applicable to an imaging apparatus such as a digital camera including an electronic viewfinder. The present invention is also applicable to a personal computer, a personal digital assistant (PDA), a mobile-phone terminal, a mobile image viewer, a game machine, a music player, and an electronic book reader, all of which control a display viewed with the user's eye being in contact with a viewfinder.

The present invention can also be realized by executing the following processing. That is, software (program) for realizing the functions of the above exemplary embodiment is supplied to a system or an apparatus via a network or various storage media, and a computer (or a CPU or a micro processing unit (MPU)) of the system or the apparatus reads and executes the program code. In this case, the program and the storage medium storing the program constitute the present invention.

According to an exemplary embodiment of the present invention, characters can be input in a user-friendly manner by avoiding drawbacks in operating a soft keyboard while looking into an eyepiece viewfinder.

Embodiments of the present invention can also be realized by a computer of a system or apparatus that reads out and executes computer executable instructions (e.g., one or more programs) recorded on a storage medium (which may also be referred to more fully as a 'non-transitory computer readable storage medium') to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s).

The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-076396 filed Apr. 1, 2013, which is hereby incorporated by reference herein in its entirety.

What is claimed is:

1. A display control apparatus comprising:
    a first display unit configured to display a GUI including a plurality of selection items in an eyepiece viewfinder;
    a second display unit configured to display, in a similar format, the same GUI including the same plurality of selection items that are displayable in the first display unit, while being visible without a user's eye being in contact therewith;
    a display control unit configured to perform control to display a soft keyboard on the second display unit without displaying the soft keyboard on the first display unit in response to an operation for displaying the soft keyboard during display via the first display unit;
    an operation control unit configured to detect a touch operation performed on the second display unit and to input characters in response to a touch operation performed on the soft keyboard displayed on the second display unit; and
    a direction operation member, separate from the first display unit and second display unit, configured to instruct a direction,
    wherein the operation control unit performs control to select any of a plurality of items displayed on the first display unit in response to an operation performed on the direction operation member, and to disable an operation performed on the direction operation member in response to the operation for displaying the soft keyboard during display on the first display unit,
    wherein the plurality of selection items displayable on both the first and second display units includes at least one selection item including indicia representing a soft keyboard associated with the at least one selection item, so as to connote to an operator of the display control apparatus that selection of the at least one selection item having the indicia representative of the soft keyboard associated therewith, will result in display of the soft keyboard.

2. The display control apparatus according to claim 1, wherein the display control unit is configured to perform control not to display the first display unit in response to the operation for displaying the soft keyboard during display on the first display unit.

3. The display control apparatus according to claim 1, wherein the display control unit is configured to perform control to turn off the first display unit in response to the operation for displaying the soft keyboard during display on the first display unit.

4. The display control apparatus according to claim 1, wherein the display control unit is configured to display, in response to instructions for not displaying the soft keyboard, a screen including characters which are input in response to an operation performed on the soft keyboard on the first display unit.

5. The display control apparatus according to claim 1, wherein the display control unit performs control to display, on the first display unit, a guidance that urges a user to perform an operation by viewing the second display unit, in response to the operation for displaying the soft keyboard during display on the first display unit.

6. The display control apparatus according to claim 1, further comprising a luminance control unit configured to perform control to increase a luminance of the second display unit in response to the operation for displaying the soft keyboard during display on the first display unit.

7. The display control apparatus according to claim 1, further comprising:
    an external light sensor; and
    a luminance control unit configured to perform control to change a luminance of the second display unit based on brightness detected by the external light sensor, in response to the operation for displaying the soft keyboard during display on the first display unit.

8. The display control apparatus according to claim 1, wherein, if the second display unit does not perform display, the display control unit performs control to turn on the second display unit to display the soft keyboard thereon in response to the operation for displaying the soft keyboard during display on the first display unit.

9. The display control apparatus according to claim 1, wherein, if the second display unit does not perform display, the display control unit performs control to display a screen for selecting whether to turn on or off the second display unit on the first display unit in response to the operation for displaying the soft keyboard during display on the first display unit, and to display the soft keyboard by turning on the second display unit in response to an operation for selecting turning on the second display unit.

10. The display control apparatus according to claim 8, wherein, if the second display unit which does not perform display is turned on to display the soft keyboard, the display control unit turns on the second display unit with a luminance thereof set to a minimum luminance.

11. The display control apparatus according to claim 1, further comprising an imaging unit,
wherein the first and second display units are capable of displaying an image being captured by the imaging unit.

12. A method for controlling a display control apparatus comprising:
displaying, via a first display unit, a GUI including a plurality of selection items in an eyepiece viewfinder;
displaying, via second display unit, the same GUI in a similar format including the same plurality of selection items displayed by first display unit, so that the GUI display is visible without a user's eye being in contact therewith the second display unit;
controlling, via a control unit, the second display unit to display a soft keyboard on the second display unit without displaying the soft keyboard on the first display unit in response to an operation for displaying the soft keyboard during display via the first display unit,
detecting, via an operation control unit, a touch operation performed on the second display unit and inputting characters in response to the touch operation performed on the soft keyboard displayed on the second display unit; and
controlling, via a direction operation member separate from the first display unit and second display unit, control to select any of a plurality of items displayed on the first display unit in response to an operation performed on the direction operation member, and to disable an operation performed on the direction operation member in response to the operation for displaying the soft keyboard during display on the first display unit,
wherein the plurality of selection items displayable on both the first and second display units includes at least one selection item including indicia representing a soft keyboard associated with the at least one selection item, so as to connote to an operator of the display control apparatus that selection of the at least one selection item having the indicia representative of the soft keyboard associated therewith, will result in display of the soft keyboard.

13. A non-transitory computer-readable storage medium storing a program for causing a computer to execute the method according to claim 12.

* * * * *